3,499,622
JUNCTIONS BETWEEN THE FUSELAGE AND
WINGS OF AN AIRCRAFT
Michel Germain Lugan and John Guy Surcin, Toulouse,
France, assignors to Sud-Aviation Société Nationale
de Constructions Aeronautiques, Paris, France
Filed Mar. 19, 1968, Ser. No. 714,222
Claims priority, application France, Mar. 22, 1967,
99,833
Int. Cl. B64c 7/00
U.S. Cl. 244—130        10 Claims

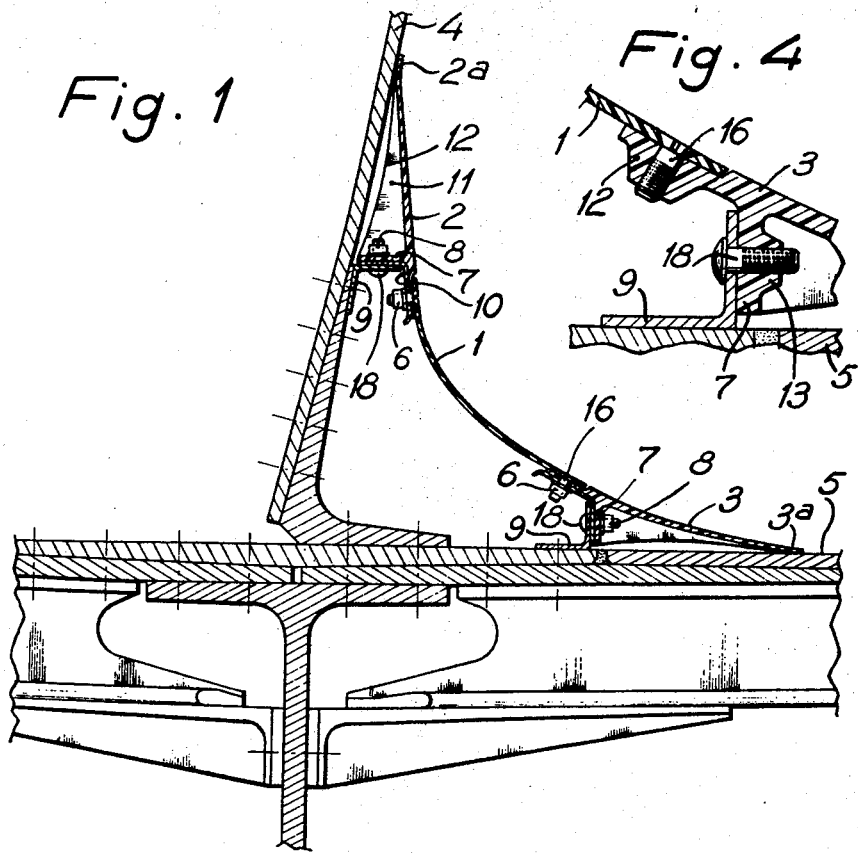
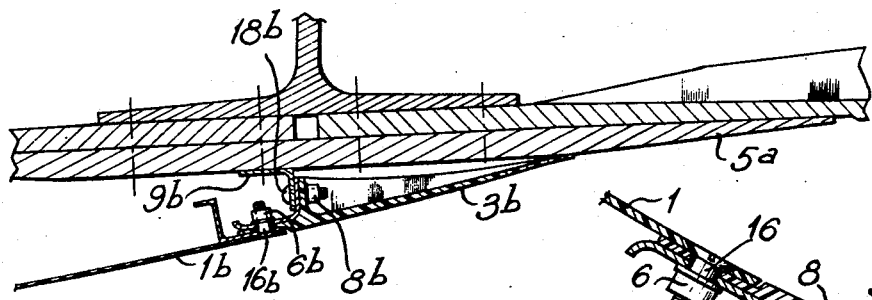
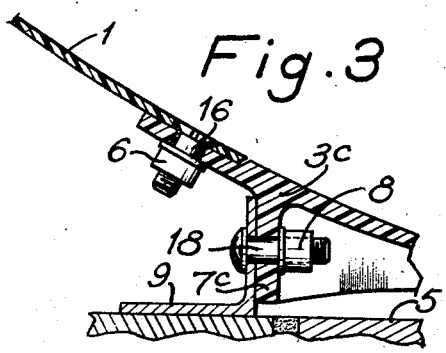

ABSTRACT OF THE DISCLOSURE

A fairing panel between a wing and a fuselage of an airplane is constituted by three panel elements wherein the intermediate panel is secured at its ends to securing ribs of respective end panels, the securing rib of one end panel being attached to the wing while the securing rib of the other end panel is attached to the fuselage. The end panels have resiliency at least at the ends thereof remote from the securing ribs so as to form lips respectively bearing resiliently against the wing and fuselage. The fasteners which attach the securing ribs to the wing and fuselage have heads which are accessible when the intermediate panel is removed.

---

The present invention relates to an arrangement of fairing panels for the junction between the fuselage and wings of an aircraft, comprising at least three longitudinal elements, in which the end panels are made of materials having permanent elasticity and are provided with subjacent means for fixing them to the aircraft structure, said means being accessible from the location of at least one removable intermediate panel and, remote from said means, with a lip bearing freely and elastically against the corresponding outer surface of the wing in the case of one of said end panels and of the fuselage in the case of the other.

This invention relates to an improvement to the fairings known as fillets used at the junction of the fuselage and wings of an aircraft. Such fillets may consist of a single shaped panel, or, in the case of large aircraft, of several longitudinal, transverse, or compositely transverse and longitudinal elements.

This invention relates more specifically to fillets of the three-part variety, the two end panels of which are respectively connected to the fuselage and the wing, and includes an improvement to the fabrication and fitting of these end panels obtained by the use of the new plastics utilized in aeronautical engineering.

The invention accordingly has for its object fairing panels consisting of at least three longitudinal elements, in which the end panels are made of materials having permanent elasticity, such as reinforced or non-reinforced synthetic plastics, said end panels including subjacent means for fixing the same to an airframe which are accessible from the location of at least one removable intermediate panel, and, remotely therefrom, a lip bearing elastically and freely against the corresponding outer surface of the wing in the case of one of said end panels and of the fuselage in the case of the other.

The screw means for fixing the end panels to the airframe and for fixing the intermediate panel include either strip-nuts secured beforehand to the end panels or local tapped bosses, in order to provide accessibility to the screw heads.

The fillets used heretofore at the junction of the wings and the fuselage were fitted permanently, required the provision of non-demountable box beams, and had their ends secured at a point level with the junction with the airframe. Because these securing points were subordinated to already existing structural members like stringers, stiffeners, reinforcements and the like, they required that the fillet be offered up to the aircraft to ensure proper matching, as well as special contouring of the fillet so as to match the outlines of the rivets, thereby entailing a loss of time.

The subject fillets of this invention, which are made of a plastic such as the plastic known by the trade name "Rilsan," offer the following advantages:

No attachments are required at the point where the fillet is tangential to the airframe, thus saving construction and maintenance time. The blending portion is applied under pressure against the airframe.

The fillet is fully demountable, thus eliminating inaccessible closed spaces when the aircraft is operational and enabling normally masked structural members to be inspected for corrosion or cracks.

Ease of fabrication and fitting.

Such fillets can be shaped by moulding or by means of a contoured strip ribbed to a pitch depending on the profile adopted.

The description which follows with reference to the accompanying non-limitative exemplary drawing will give a clear understanding of how the invention can be carried into practice.

In the drawings:

FIGURE 1 is a sectional view with cutaway of an arrangement of fillet panels as hereinbefore disclosed.

FIGURE 2 is a detail view on an enlarged scale of the fillet shown in FIGURE 1.

FIGURES 3 and 4 are alternative embodiments to that shown in FIGURE 2.

The fillet shown in the drawing is made up of three elements, of which the intermediate element 1 is shown as being a laminate (but which could equally be made of sheet metal) and of which the end elements 2 and 3, joined to the fuselage 4 and the wing panel 5 respectively, are made of the synthetic plastic known by the trade name "Rilsan." Each of the end elements 2 (or 3) includes a lip-forming lateral extremity 2a (or 3a) which remains applied against the corresponding skin panels of the airframe, to wit of the fuselage 4 and the wing 5 respectively, while the other extremity not only offers a bearing surface to intermediate element 1 and is connected thereto by screws 16 and strip-nuts 6 but also forms a stiffening attachment rib 7 perpendicular to the structure and attached by a further set of screws 18 and strip-nuts 8 to an angled member 9 which is in turn fast with the structure, the dot-dash lines on the drawing being schematic representations of the rivet lines. Strip-nut 8 is fixed beforehand to the inside face (inaccessible after assembly) of attachment rib 7. An intermediate part 10 carriers the strip-nut 6, likewise fixed beforehand. This part 10 is furthermore clamped between attachment ribs 7 and angled member 9 and acts as a longitudinal reinforcement. The fixing holes on the angled members 9 may be made oblong to permit longitudinal adjustment.

The plastic used for the fillet must have good resistance to ageing so that it should retain its elasticity, an essential requirement for devising a fillet as hereinbefore disclosed.

At the bottom of FIGURE 1 is shown the arrangement adopted for the fuselage-wing fillet on the lower wing surface, with the top of FIGURE 1 showing the arrangement on the upper wing surface. The arrangement on the lower wing surface is substantially very similar except for a few minor modifications of shape. This portion of FIGURE 1 however is bounded by a cutaway at the wing edge of the fillet. Like parts are designated by like numerals followed by the suffix b.

In this particular arrangement the heads of the screws 18 emerge into the space covered by intermediate panel 1 and are therefore accessible after the latter has been removed or before it has been fitted, said screws cooperating with the corresponding self-locking strip-nuts 8. The panel 1 is itself secured by countersunk screws 16, with interposed bonded and dished washers. The heads of the screws 16 are accessible from the exterior and likewise cooperate with associated self-locking strip-nuts 6.

The end panels 2 may include suitably distributed internal ribs 11 extending roughly at right angles to attachment ribs 7 and formed with an inner arcuate edge 12 to allow the lip 2a to bear elastically against the fuselage of the aircraft.

In the embodiment shown in FIGURE 3, the intermediate part 10 is dispensed with, the edge of end panel 3c and the rib 7c being reinforced accordingly.

Since the plastic used has proved to have self-locking properties, an advantageous alternative form of embodiment consists in dispensing with the strip-nuts by inserting the screws directly into the end panel, the latter being possibly reinforced with bosses 12, 13, or with extra thicknesses at the corresponding places (see FIGURE 4).

It goes without saying that modifications and substitutions of parts may be made to the embodiments described hereinabove without departing from the scope of the invention.

What we claim is:

1. In an arrangement of fairing panels forming a fillet at the junction between the fuselage and wing of an aircraft, in combination, longitudinal panel elements comprising first and second end panels, at least one removable intermediate panel, first subjacent securing means on said end panels, associated second securing means on the airframe of said aircraft, said first securing means at least being accessible from the location of an intermediate panel, and marginal areas on said end panels at least possessing permanent properties of elasticity whereby to form a lip for bearing freely and elastically against the associated skin surface of said wing in the case of one of said end panels and of said fuselage in the case of the other.

2. In an arrangement as claimed in claim 1, in combination, first securing means comprising a longitudinal marginal internal rib extending transversely of the inside face of said end panel, and screws cooperating mechanically with said rib and with said second securing means and having their heads emerging toward the location of a removable intermediate panel.

3. In an arrangement as claimed in claim 1, in combination, an internal end panel border forming a supporting surface for an associated border of a removable intermediate panel, and screws inserted from outside through the thickness of said associated border, having their heads flush with the surface thereof, and cooperating mechanically with said borders.

4. In an arrangement as claimed in claim 2, strip-nuts mechanically rigid with said first securing means, the latter being positioned behind said second securing means in relation to the location of an intermediate panel.

5. In an arrangement as claimed in claim 3, first securing means and internal end panel borders respectively formed with bosses surrounding tapped holes for receiving screws directly thereinto.

6. In an arrangement as claimed in claim 1, second securing means formed by longitudinally extending angle-members.

7. In an arrangement as claimed in claim 6, an intermediate sectional member forming a longitudinal reinforcement positioned between said first securing means and said angle-member.

8. In an arrangement as claimed in claim 1, end panels made of synthetic plastics and intermediate panels made of a laminated material.

9. In an arrangement as claimed in claim 1, intermediate panels made of sheet metal.

10. In an arrangement as claimed in claim 1, end panels provided on their inside face with transverse ribs so contoured as to clear the airframe and allow said lip to bear thereagainst.

References Cited

UNITED STATES PATENTS

| 2,641,029 | 6/1953 | Trimmer | 52—288 X |
| 2,927,749 | 3/1960 | Brownell | 244—130 X |

MILTON BUCHLER, Primary Examiner

THOMAS W. BUCKMAN, Assistant Examiner

U.S. Cl. X.R.

52—288; 241—131, 132